Aug. 13, 1963  J. W. KISSEL  3,100,473
APPARATUS FOR MEASURING ANIMAL ACTIVITY
Filed Jan. 30, 1961  3 Sheets-Sheet 1

INVENTOR.
John W. Kissel
BY Olson, Mecklenburger,
Von Holst, Pendleton and Neuman
Attorneys Aug. 13, 1963 J. W. KISSEL 3,100,473
APPARATUS FOR MEASURING ANIMAL ACTIVITY
Filed Jan. 30, 1961 3 Sheets-Sheet 2

INVENTOR.
John W. Kissel
BY Olson, Mecklenburger,
Von Holst, Pendleton & Neuman
Attorneys Aug. 13, 1963  J. W. KISSEL  3,100,473
APPARATUS FOR MEASURING ANIMAL ACTIVITY
Filed Jan. 30, 1961  3 Sheets-Sheet 3

INVENTOR.
John W. Kissel
BY Olson, Mecklenburger,
Von Holst, Pendleton and Newman
Attorneys United States Patent Office 3,100,473
Patented Aug. 13, 1963

3,100,473
APPARATUS FOR MEASURING ANIMAL ACTIVITY
John W. Kissel, Evansville, Ind., assignor to Mead Johnson & Company, Evansville, Ind., a corporation of Indiana
Filed Jan. 30, 1961, Ser. No. 85,523
5 Claims. (Cl. 119—1)

This invention relates to an apparatus for measuring animal activity and more particularly pertains to improvements in a cage having a labile floor and associated mechanism for recording movement of said floor.

It is common practice in the course of developing new drugs and medicines to study their effect by means of experiments involving various animals. The use of mice, dogs and other animals for experimental purposes oftentimes enables sufficient data to be obtained so that subsequent tests on humans may be carried out in substantially complete safety. The ready availability of large numbers of small animals, such as mice, for experimental purposes enables an extensive testing program to be carried out in a minimum amount of time. An extensive testing program simultaneously investigating many aspects of a new development by producing a maximum amount of information in a minimum amount of time obviously assists in materially reducing the developmental expense.

In drug research, various devices are employed for quantitatively measuring the motor activity of an animal subjected to stimulants, depressants or combinations of the two, as well as the normal activity of control groups of untreated animals. Such a device should ideally be capable of recording the slightest of movements to enable the most accurate information to be obtained, and should be designed to promote natural movement so that the test animals do not become quiescent simply out of boredom or lack of incentive to natural movement.

Various devices have been designed to attempt to meet the criteria for most satisfactory functioning of activity-measuring units. Such prior devices have included various cages on or including labile floors with movement-recording means such as fixed electrical contacts to indicate movements of the floor as the animal moves. These devices provided quantitative measurements of some of the animal's movements. However, most of the prior devices were either insensitive to slight movements, were of varying sensitivity depending upon the position of the animal, permitted substantial movements of various types without satisfactory recordation, and/or failed to naturally stimulate animal activity. Due to the latter failing, even a normal animal usually tended to become relatively quiescent in a short period of time, thus making true comparative or quantitative studies difficult to conduct and/or rendering the results somewhat indefinite.

Accordingly, it is an object of this invention to provide a novel animal-activity measuring apparatus which will accurately sense and record even slight movements of an animal over a given period of time.

It is another object of this invention to provide a novel improved activity-measuring apparatus which promotes natural animal activity for extended periods of time.

It is a further object of this invention to provide an activity-measuring apparatus which is constructed so as to confine an animal's movements to a definite path whereby movement can be sensitively and uniformly recorded, and to assure recordation of slight animal movement, as will hereinafter be explained in greater detail.

In one embodiment of this invention, an annular cage which may be composed of transparent plastic and have a removable top is mounted about an electrically conductive axial shaft. The lower end limit of the shaft is pivotally mounted in a fixed, vertically adjustable pivot bolt. A copper disc which may be of lesser diameter than the outside diameter of the cage is concentrically mounted on the central shaft in electrical communication therewith. A plurality of spaced electrical contacts connected to a common conductor are disposed adjacent an outer peripheral portion of said disc. Electrical leads are attached to said common conductor as well as to said shaft or pivot bolt.

In the normal course of operation, a mouse or other animal, the activity of which is to be measured, is placed in the annular cage. The cross-sectional dimensions of the cage are such that the confined mouse cannot stand upright or proceed radially toward the shaft. The mouse activity, therefore, is substantially limited to proceeding in a circular path within the cage.

Since the annular cage and disc are concentric and uniformly arranged relative to their common center, the animal will force the disc portion beneath the cage portion in which it is disposed to engage the underlying spaced contacts. The central shaft moves on its pivot as the animal moves in the cage, causing the copper disc to successively engage the annularly arranged contacts. An electrical potential from an external source is applied across the copper disc and the contacts, through the electrical leads, and an electrical circuit is thus established and broken with each engagement and disengagement of the copper disc with an underlying contact. By placing an impulse counter in series with the contacts, the number of contacts engaged by the disc over a given period of time is recorded and a record of the confined animal's activity obtained, as will hereinafter be explained in greater detail.

For a more complete understanding of this invention, reference will now be made to the drawings, wherein—

Figure 1:
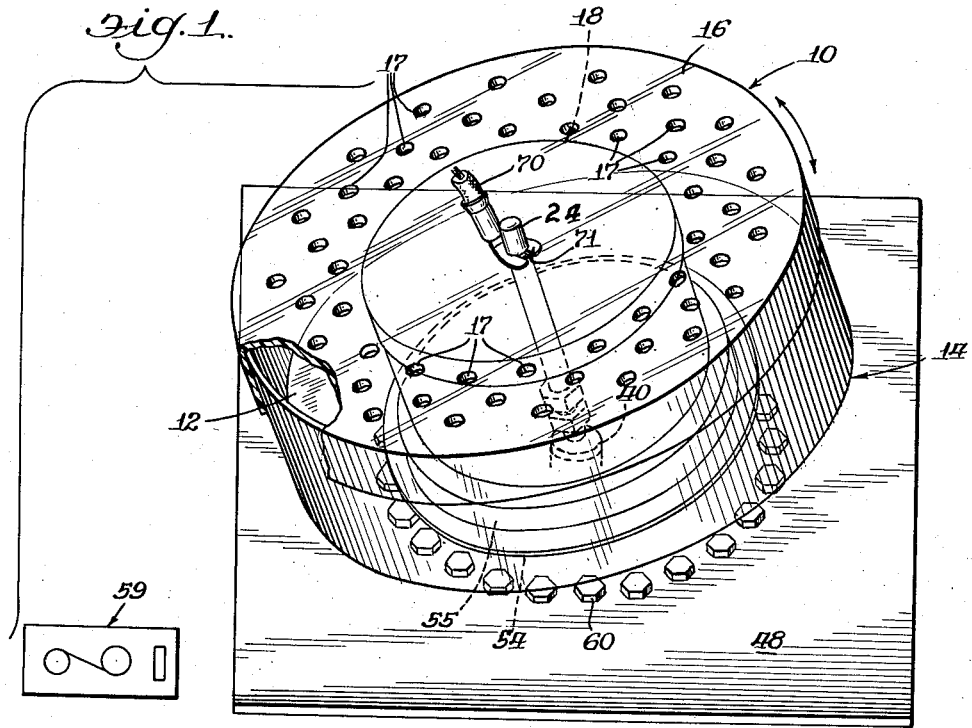
FIGURE 1 is a perspective view partially broken away of one embodiment of an activity-measuring apparatus made in accordance with the teachings of this invention.
Figure 2:
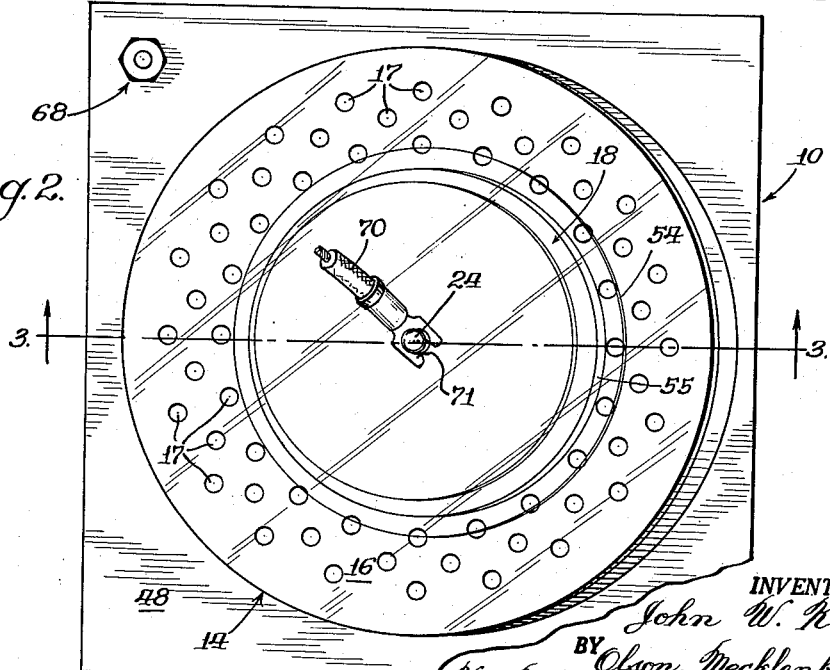
FIG. 2 is a fragmentary top-plan view of the apparatus illustrated in FIG. 1.
Figure 3:
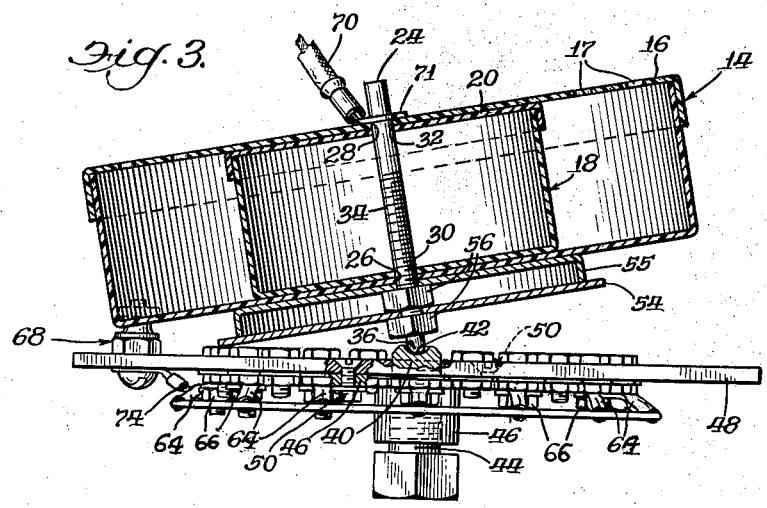
FIG. 3 is an elevational view, partly in section, taken along lines 3—3 of FIG. 2.

Referring now more particularly to FIGS. 1–3, an activity cage 10 is illustrated having an outer peripheral annular cage chamber 12 in which an animal, the activity of which is to be measured, may be disposed. The annular cage 12 may be defined by means such as the illustrated cylindrical plastic container 14, having perforated cover 16, in which a smaller plastic container 18 is disposed. Container 18 has a height equal to the height of the wall of plastic container 14, as will be most clearly seen from the sectional view of FIG. 3. Container 18 employs a cover 20 which snugly engages the bottom surface of cover 16 of container 14 in the normal position of assembly, as is also most clearly seen from FIG. 3.

Both containers 14 and 18 are uniformly circular in horizontal cross section and are centrally apertured so that they may assume the concentric relationship illustrated by being mounted on a centrally disposed shaft 24. The bottom of container 14 is apertured at 26 and the cover apertured at 28. The bottom of container 18 is similarly centrally apertured at 30 and the cover thereof apertured at 32, to allow passage of shaft 24.

Figure 4:
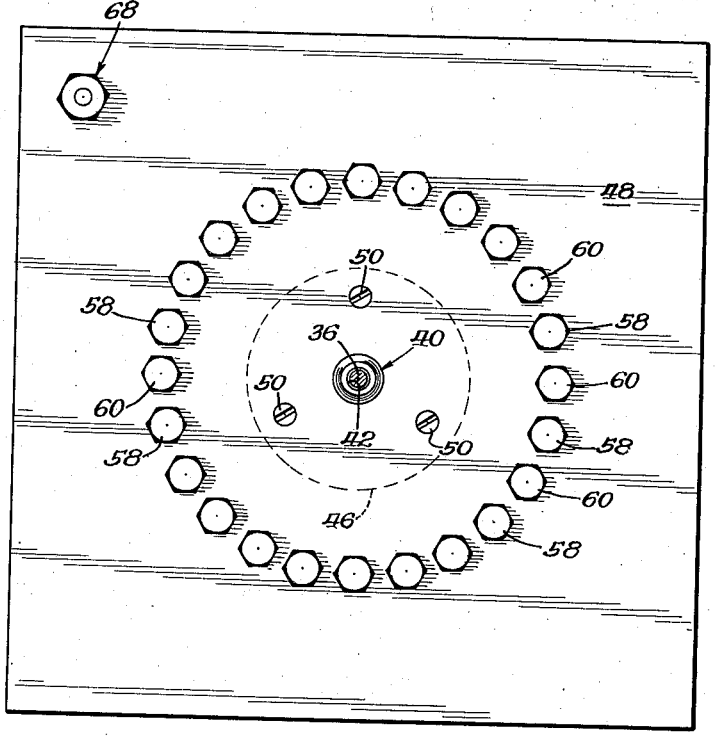
FIG. 4 is a top-plan view of the contact platform of the illustrated device.

Shaft 24 may comprise a stud as illustrated which is threaded at 34 and which also has a rounded lower end limit 36. It is the function of end limit 36 of shaft 24 to pivot on a vertically adjustable pivot such as pivot bolt 40, most clearly seen in FIGS. 3 and 4. Pivot bolt 40 has a concave recess 42 disposed in the upper end limit thereof in which lower end limit 36 of shaft 24 of the above-described container assembly may pivotally move to permit polydirectional or universal tilting of shaft 24. Bolt 40 is threaded at 44 whereby it may threadedly engage the female threads disposed in pivot mount or support 46 which is, in turn, secured to the under surface of a platform 48 of an electrically insulating material by means of nut-and-bolt assemblies 50, more clearly seen in FIG. 6. It is apparent from FIG. 3 that by threadedly advancing or withdrawing the vertically adjustable pivot bolt 40 relative to the mount 46, the disposition of the concavity 42 of pivot bolt 40 relative to the surface of platform 48 is regulated.

Figure 5:
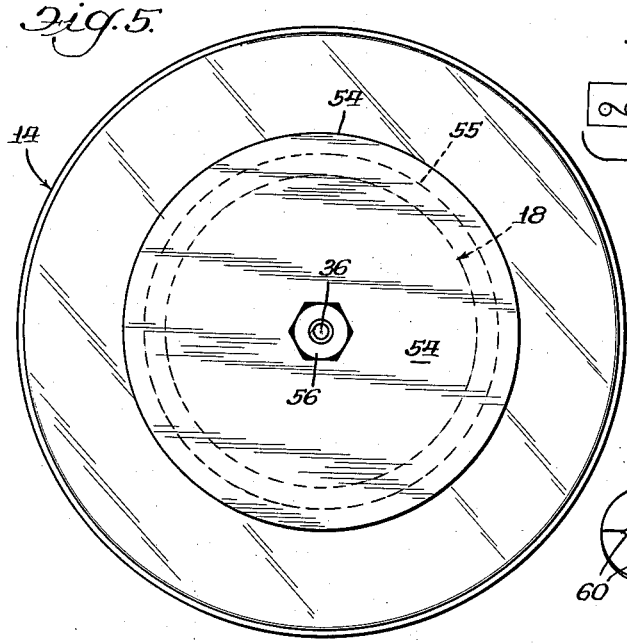
FIG. 5 is a bottom view of the activity cage and associated disc of the illustrated apparatus.

Also mounted on shaft 24 beneath the concentrically arranged circular containers 14 and 18 is a copper disc 54 which is concentrically disposed on central shaft 24, as is most clearly seen in FIG. 5. The latter view illustrates the relative dispositions of the disc, containers and shaft. Disc 54 is locked to shaft 24 by means of nut members 56, illustrated in FIG. 3, which threadedly engage shaft threads 34. It is most apparent from FIGS. 1 and 3 that the animals confined in annular cage 12 of the illustrated apparatus are electrically isolated from shaft 24 and disc 54 by the interposed portions of containers 14 and 18.

Figure 7:
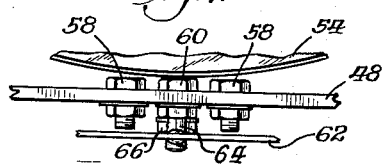
FIG. 7 is a fragmentary elevational view illustrating the engagement between the disc member and a portion of the contacts disposed at the top of the contact platform of the illustrated apparatus.
Figure 8:
FIG. 8 is a wiring diagram of the illustrated apparatus.
Figure 8:
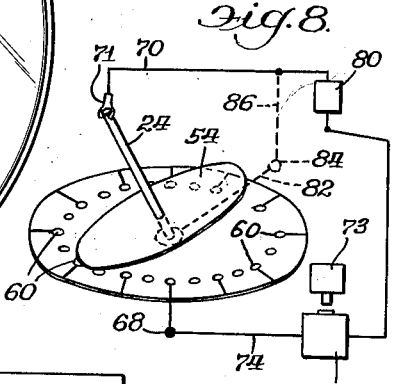
Figure 6:
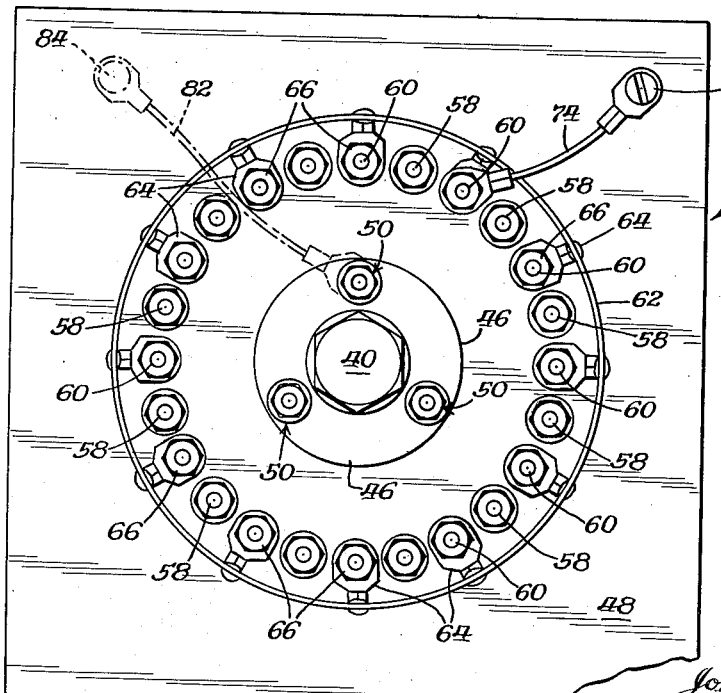
FIG. 6 is a fragmentary bottom view of the contact platform of the illustrated apparatus and showing a modification in dashed lines.

Referring now also to FIGS. 6–8, platform 48 is provided with a plurality of contacts 58 and 60 alternately arranged in closely spaced relation and disposed in circular configuration concentrically with pivot bolt 40 beneath the outer periphery of the disc 54 of the container assembly. Contacts 60 are in communication with a common conductor 62 by means of engaged clips 64 which are retained on the shank portions of contact bolts 60 by means of nuts 66. The contacts 60 are interspersed with bolts 58 which are electrically isolated from contacts 60. Electrical contact is established between contacts 60, connected in parallel, and a terminal 68 (see FIG. 4) by means of lead 74 illustrated in FIG. 6. It will be seen from FIGS. 3 and 7 that the upper disc-contacting surfaces of contacts 58 and 60 are disposed in substantially the same horizontal plane and arranged in such proximity to each other that disc 54 may rotatably move thereover with a minimum of resistance in a smooth, even manner.

In the normal course of operation cover 16 of container 14 is removed and a mouse or other animal, the activity of which is to be measured, is disposed in the annular chamber or cage 12 defined by the concentrically arranged containers 18 and 14. Cover 16, which is apertured at 17 for the admission of air, is then replaced atop container 14. Because of the symmetrical nature of the container and disc assembly about shaft 24, the container assembly is nearly self-balanced and will freely pivotally move toward the location of the animal disposed in the annular chamber 12. As a result of such pivotal movement, disc 54 will contact the underlying circularly arranged contacts 60 and 58 in the manner illustrated in FIGS. 1, 3 and 7. The disc 54 will not balance itself out of contact with the underlying contacts when an animal is confined in the overlying cage.

It should be noted that disc 54 will engage only one contact member or two adjacent contact members at any one instant, as illustrated in FIG. 7. It is never possible, therefore, for disc 54 to engage two contact members 60 or two contact members 58 at the same time. It should also be noted that annular spacer member 55, most clearly seen in FIG. 3, or other equivalent spacer means may be employed for supporting containers 14 and 18 and for preventing interfering contact between the peripheral edge of container 14 and underlying contact platform 48, which would prevent contact between disc 54 and contacts 58 and 60 disposed therebeneath.

The cross-sectional dimensions of the annular passageway 12 of the illustrated apparatus should be such that the confined animal cannot rise up in a vertical position or proceed radially inwardly toward shaft 24. By such proper dimensioning, therefore, the confined animal is limited to translational movement along the annular route over the contacts 60 as described by the cage chamber 12. It will be appreciated that in the course of so proceeding, the confined animal in chamber 12 is unable to ascertain the nature of its place of confinement, that is, the extent or limits of his cage cannot be seen by the confined animal at any instant. As a result, the natural curiosity of the animal which leads him to seek the limits of his place of confinement is usually extended for longer periods of time. Accordingly, the activity of the confined animal is maintained on a measurable level for more extensive periods.

Experimental results have indicated that when an activity cage of the type illustrated was employed, mice, confined for three hours, possessed 70 percent of the activity of the first hour in their second hour of confinement and 53 percent of their activity of the first hour of confinement in their third hour of confinement. These percentages are to be compared with a second group of mice confined in an activity-recording apparatus in which the limits of the confining cage could be determined at once by the animals. In the latter apparatus only 23 percent of the activity of the first hour of confinement was retained during the second hour of confinement, and only 10 percent of the activity of the first hour of confinement was retained during the third hour of confinement. It has also been found that mice, when placed in an enclosure whose limits are at once visible, will usually relatively rapidly cease activity and remain motionless for long periods of time. It appears, therefore, that the annular nature of the cage portion 12 of the provided apparatus stimulates the confined animal's curiosity so that it is active for greater periods of time. Accordingly, more accurate activity results are obtained per unit-time when apparatus having a cage such as that above described is employed.

As the confined animal proceeds in its annular path about the passageway 12, underlying disc 54 engages contacts 58 and 60 with a smooth rolling motion. It will be noted from FIG. 3 that the engagement of disc 54 and each contact is substantially a line engagement so that friction between the disc and contacts is maintained at a minimum. Disc 54 is preferably disposed at a slight angle of inclination, preferably less than about 15 degrees, in the normal position of use, to minimize the rolling action of the cage and disc and so that little or no slippage will occur in the course of animal movement over the floor of cage 12. The smaller the angle of inclination, the more sensitive will be the device to movement of the animal, within a lower limit determined by the mechanical accuracy of the construction and thus the angle at which disc 54 will contact two contacts 60 at the same time. To assist in eliminating slippage of the confined animal on the labile cage floor, the surface thereof may be roughened or a friction-inducing substance disposed thereon.

The number of contacts engaged by the disc 54 is directly proportional to the activity of the confined animal. Thus, by employing a recording means sensitive to the engagement of the disc 54 with contacts 58 and/or 60, the activity of the animal may be determined.

Referring now more particularly to the wiring diagram of FIG. 8, a preferred method of recording the disc-contact engagements is illustrated. By attaching an electrical lead 70 to a clip 71 which does not rotate but which is in continuous contact with an upper portion of shaft 24, as by resting in a groove thereof, and by attaching another lead 74 to terminal 68, an electrical potential from a source 80 may be established between disc 54 and contacts 60. A circuit is then completed through an electrical impulse counter 72 of a well-known type when disc 54 engages a contact 60.

Figure 9:
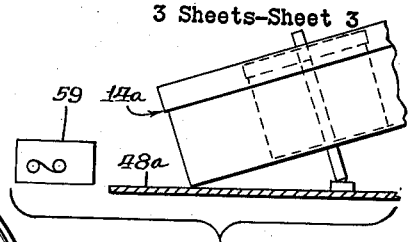
FIG. 9 is a fragmentary elevational view on a reduced scale of a modified activity-measuring apparatus construction.

Since only one contact 60 may be engaged at any one instant by disc 54, the rotatable movement of the disc over the contacts 60 results in the continual breaking and establishing of the electrical circuit, thereby creating electrical impulses which are recorded in the impulse counter 72. The information from the circuit may also be recorded on a conventional kymograph, tape recorder or the like, or some suitable combination of such devices. For instance, if a record of the number of impulses per small time interval is desired, a camera 73 may be employed for photographing the number of impulses registered on the counter 72 per desired time interval. The wiring diagram of FIG. 8 clearly illustrates the manner whereby the impulse circuit is established from source 80 through shaft 24 by means of lead 70, through disc 54 to the contacts 60, and from the contacts 60 to impulse counter 72 by means of connecting electrical conduit 74. In some installations a sound recorder may be used to directly record sounds generated by movement of the cage assembly, either clicks caused by protuberances, or other interrupted sounds, or by a Doppler or sound-intensity recording, by use of a recorder such as tape recorder 59 (see FIG. 1). Such an installation is also illustrated in FIG. 9 wherein the peripheral edge of a cage 14a directly rotatably engages a sound-generating support surface 48a. However, the illustrated electrical measuring arrangement is preferred in normal installations where many units are operated in close proximity to one another and where most accurate results are desired.

When the pivot bolt 40 and mount 46 are of electrically conductive material the lead 70 above the cage may be replaced by a fixed lead arrangement. For instance, as shown in dashed lines in FIGS. 6 and 8, lead 82 is attached to a bolt 50 and to a fixed terminal 84. A further lead 86 may then extend from terminal 84 to source 80. Shaft 24 of course contacts the pivot bolt and provides a conductive path to the disc 54. Clip 71 or some similar means is retained for securing the container tops in position. Eliminating lead 70 in this manner facilitates handling of the cages and precludes any possible restriction of movement of the shaft and disc by this lead.

It is seen, therefore, from the foregoing description that an activity-recording device has been provided which limits the confined animal to movement along a predetermined annular path, in general alignment with the closely spaced contacts of the sensing apparatus and at a substantially uniform distance from the pivot axis. Subsestantially any movement which the animal makes will produce a rotation of disc 54 and in the preferred embodiment the resulting variations in the electrical circuit will create impulses to be recorded by means such as the impulse counter, thus sensitively measuring even slight movements of the animal. The animal at all times remains at a substantially uniform distance from the pivot axis resulting in a uniform response of the sensing apparatus. Further, since the limits of the cage are not readily apparent to the confined animal, his curiosity is usually maintained, thereby encouraging extended natural activity. The particular cross-sectional configuration of the chamber 12 is designed in conjunction with the physical dimensions of the confined animal. Accordingly, whereas the annular cage portion 12 of the illustrated apparatus would be suitable for use with mice, a larger annular chamber construction, as for a dog, might require a somewhat different cross-sectional configuration more suitable for preventing movements of the confined animal which would not produce a rotational movement of the cage.

It is believed apparent that many changes in construction may be made in the illustrated apparatus in light of the foregoing teachings, by those skilled in the art, which will not withdraw the resulting construction from the scope of the disclosed invention. For example, although an impulse counter has been disclosed as means sensitive to the rotation of the cage over a support surface, other means sensitive to and capable of recording the revolutions of the shaft 24 or cage 12 are adaptable for use with the provided construction. Central shaft 24 need not pass through the containers 14 and 18 as illustrated but may merely engage the bottom surface of the cage and disc 54 at the centers thereof, or otherwise engage disc 54 and support the cage unit. Contacts 60 may be set flush in an insulating platform, thereby eliminating separate contacts 58 and providing a smoother rolling surface for disc 54. Other arrangements may be made for connecting the electrical leads, so long as a potential is applied between the movable contact member 54 and the contacts 60. In lieu of being pivotably supported on the base of shaft 24, the annular cage may be suspended from a universal joint above the cage, for instance, on the upper portion of shaft 24, and the fixed electrical contacts could be positioned above or in close circumannular spaced relation to movable electrical contact member, such as disc 54, fixed to the cage unit. It is intended, therefore, that this invention be limited only by the appended claims.

I claim:

1. In an apparatus for measuring animal activity, the combination of a circular member connected to a central generally vertical support shaft, said shaft being universally tiltably movable; support means disposed beneath an outer peripheral portion of said circular member, said outer peripheral portion rotatably engaging said support means in the normal course of shaft tilting movement; animal-confining, closed-circuit passageway cage means disposed concentrically with said circular member and including a floor supported on said shaft; and means operably associated with said circular member and said support means and sensitive to engagement therebetween for recording the extent of such engagement, said cage means being of such configuration and dimensions relative to an animal to be confined therein that such animal is unable to see the extent of the limits thereof and is unable to proceed in a path other than substantially normal to radii extending from the extended central axis of said circular member.

2. In an apparatus for measuring animal activity, the combination of an annular cage means, a shaft centrally disposed of said cage and on which said cage means is mounted, said shaft being universally tiltably mounted at its lower end limit, substantially uniplanar support means disposed beneath an outer peripheral portion of said cage means, said outer peripheral portion of said cage means including an edge rotatably engaging said support means in the normal course of tilting movement of said shaft, and means sensitive to engagement of said peripheral edge and support means and in contact therebetween for quantitatively measuring the extent of such engagement.

3. In an apparatus for measuring animal activity the combination of an annular cage, a central shaft connected to said cage and extending therebelow, said shaft universally tiltably mounted at its lower end limit, a circular electrically conducting member disposed beneath said cage on said shaft, a plurality of electrical contacts connected in parallel and disposed about a circle beneath the outer peripheral portion of said circular member, said circular member rotatably engaging said contacts in the normal course of central shaft tilting movement, support means disposed between each adjacent pair of said electrical contacts and electrically insulated from said contacts, said contacts and said support means presenting circular-member contacting surfaces disposed in substantially the same plane for supporting said circular member and whereby said circular member engages not more than one of said electrical contacts at any one instant, electrical circuit means connected to and applying an electrical potential to said circular electrical conducting member and said contacts whereby an electrical circuit is completed when said circular member contacts each of said contacts, and means in said circuit means for recording the electrical impulses generated when said circular electrically conducting member engages each of said contacts.

4. In an apparatus for measuring animal activity, the combination as in claim 3 and wherein said electrical contacts are disposed in closely spaced relation to one another.

5. In an apparatus for measuring animal activity the combination of an annular cage formed with uniform cross-sectional dimensions so related to the size of the animal to be confined therein that such animal is prevented from moving in a path other than along the annulus defined by said annular cage, a shaft centrally disposed of said cage, and on which said cage is mounted, said shaft extending below the bottom of said cage whereby said cage bottom is normally inclined to the horizontal at an angle of less than about 15 degrees when said shaft and cage are disposed on a horizontal planar surface, the lower end of said shaft being universally tiltably supported, substantially horizontally disposed support means disposed beneath said cage, circular contacting means supported on said shaft and contacting said support means, nutational movement of said shaft causing rolling movement of an outer annular portion of said contacting means over said support means, and means operably associated with said outer annular portion and said support means and sensitive to said latter rolling movement for measuring the extent thereof.

References Cited in the file of this patent

UNITED STATES PATENTS

| | | |
|---|---|---|
| 583,661 | Smith | June 1, 1897 |
| 1,569,225 | Gunderman | Jan. 12, 1926 |
| 1,751,096 | Morris | Mar. 18, 1930 |
| 1,846,911 | Scow | Feb. 23, 1932 |
| 2,663,282 | Ingle | Dec. 22, 1953 |
| 2,684,051 | LeBlond et al. | July 20, 1954 |
| 2,965,724 | Kiebert | Dec. 20, 1960 |
| 2,999,688 | Gabrielson | Sept. 12, 1961 |

OTHER REFERENCES

"Spontaneous Activity in the Rat," by J. T. Eayrs, published in The British Journal of Animal Behaviour, vol. 1, 1953 (pages 25–30).